United States Patent [19]
Schaller

[11] 3,746,252
[45] July 17, 1973

[54] MODEL RAIL STRUCTURE WITH REDUCED ELECTRICAL INTERFERENCE RADIATION FOR ELECTRICALLY DRIVEN TOYS

[75] Inventor: Rudolf Schaller, Regensburg, Germany

[73] Assignee: Siemens Aktiengesellschaft, Berlin and Munich, Germany

[22] Filed: May 2, 1972

[21] Appl. No.: 249,497

[30] Foreign Application Priority Data
May 13, 1971  Germany.................. P 21 23 775.2

[52] U.S. Cl.............................................. 238/10 E
[51] Int. Cl............................................ A63h 19/30
[58] Field of Search............... 238/10 R, 10 E, 10 F; 46/1 K; 104/60

[56] References Cited
UNITED STATES PATENTS
2,021,045  11/1935  Boisselier.......................... 238/10 E
3,583,631  6/1971  Christiansen..................... 238/10 E
3,592,384  7/1971  Tomaro............................. 238/10 E

*Primary Examiner*—Gerald M. Forlenza
*Assistant Examiner*—Richard A. Bertsch
*Attorney*—Benjamin H. Sherman, J. Arthur Gross et al.

[57] ABSTRACT

A model rail structure, producing low electrical interference radiation in use, for electrically driven track-powered toys such as model race cars, trains, and the like, having at least two current-conducting rail elements, a pair of longitudinally extending cooperable capacitor electrodes disposed in opposed relation, and a dielectric layer operatively disposed between said capacitor electrodes, with at least one of said rail elements being conductively connected to one of the capacitor electrodes and another of said rail elements being conductively connected to the other of the electrodes with the capacitor thus formed having a capacitance distributed relatively uniformly along the rail structure, the electrodes of the capacitor preferably having a configuration corresponding to that of the associated rail structure whereby the capacitor does not conflict with the natural appearnace thereof.

12 Claims, 6 Drawing Figures

Patented July 17, 1973    3,746,252

MODEL RAIL STRUCTURE WITH REDUCED ELECTRICAL INTERFERENCE RADIATION FOR ELECTRICALLY DRIVEN TOYS

BACKGROUND OF THE INVENTION

The invention is directed to a model rail structure for electrically driven toys such as toy and model trains, model auto racers and the like.

Undesirable and annoying high frequency electrical interference in radio and television receivers results from the use of certain types of electrical motors and equipment, and one of such interference sources is that produced by electrically operated toys, in particular those employing track structures of various types for the transmission of power to the driving motor of the toy, for example toy and model trains and, more recently, model auto race tracks. The high frequency interference involved is produced both in the motor of the model vehicle and by current transmission between rail and wheel, usually between the wheel and a contacting spring, or between a rail and a contacting spring, in dependence upon the construction involved. In the case of model trains and the like, in most cases current is transmitted from the rail, through the wheel or wheels and a suitable contacting spring to the motor, while in many model auto racing devices the current is supplied through woven or other brush-type contact springs which bear directly on the conductive rail structure. High frequency interference of this type spreads along the rails and supply lines and eventually reach the antenna or antenna cable of radio and television receivers, involving both ground inductive and capacitive coupling as well as direct radiation over the electrical supply lines. Interference developed in the drive motor usually may be eliminated or reduced by the utilization of chokes, capacitors, voltage-dependent resistors, etc. However, reduction in interference produced by current transfer from rail to wheels, sliding contacts or wipers, etc. usually involves the utilization of high contact pressure and the maintenance of clean contacts, rails etc. However, it will be appreciated that the cleanliness of the contacts can be maintained only for short operational periods, while the use of high contact pressures will eventually result in a premature wearing of the contacting surfaces. In spite of the above it heretofore has not been possible to comply with prescribed low levels of radio interference.

In a known method for reducing interference of this type in electrically driven toys, one of the current conducting rails is mechanically connected with the mass of the system, utilizing ceramic capacitors, but remains electrically insulated therefrom. However, this method is very expensive since a large number of individual capacitors is required, a capacitor normally being provided for each track section.

It has been established that high frequency interference not produced in the drive motor itself, but between rail and wheel, wheel contact spring, or between rail and contact spring cannot be effectively lowered by means of an individual component, such as a ceramic capacitor, at the track section. While it is true that the utilization of several such components for each rail section would in turn effect some improvement with respect to the reduction of the interference effect, such solution is impractical due to the high component cost involved.

The present invention is therefore directed to the problem of effectively lowering the high frequency interference resulting from such current transfer functions to a point where the interference will fall below prescribed and legal interference field strength values.

BRIEF SUMMARY OF THE INVENTION

The problem of interference reduction is solved in the present invention by providing a capacitor structure along the track structure having a capacitance which is distributed as evenly as possible therealong and the current conducting rails, i.e., the rails which are on different potentials are connected to the capacitor electrodes on what might be considered over a large surface area, more particularly preferably throughout the length of the rail.

Thus in such construction the distance between the interference source and the capacitor is substantially independent of the location of the model vehicle along the track structure, with such distance being extremely short and the connection between the interference source and the capacitor having very low inductivity.

Preferably, the capacitor is provided with a suitable configuration to correspond with the rail and tie structures whereby the capacitor does not in any way detract from the normal configuration which the model structure represents.

Advantageously the capacitor may comprise an insulating foil metallized on opposite sides and suitably attached to the rail supporting structure such as a simulated tie structure, for example by use of a suitable adhesive or the like. However, in some cases it may be desirable to produce the capacitor from respective metal and insulating layers which are sequentially applied upon the rail supporting structure utilizing, for example, conductive and insulating lacquers or the like. Preferably, the metallic layers are applied to the supporting structure in a laterally staggered relation with respect to each other whereby the respective capacitor electrodes may be readily contacted by an associated rail element.

In accordance with a further feature of the invention, the rail itself may be constructed to function as a portion of a capacitor electrode. In this arrangement, the rail may, for example, be of hollow construction, having a generally inverted U-shaped cross-section, with a thin insulation layer being applied to the inner face of the rail and the opposite electrode disposed thereon. It will be appreciated that in this construction the distance between the interference source and the protective capacitor is reduced to substantially a bare minimum. This embodiment is particularly advantageous, for example, with rail supporting or tie structures fabricated from metal.

The respective current rails may be connected with the cooperable capacitor electrode by any suitable means, for example soldering. However, in some cases it may be more simple and just as effective to clamp the respective rails to the associated capacitor electrodes, for example by utilizing the mounting fittings or clamps employed in effecting the mechanical connection of the rail structure to the supporting structure therefor.

BRIEF DESCRIPTION OF THE DRAWINGS

In the drawings wherein like reference characters indicate like or corresponding parts.

DETAILED DESCRIPTION OF THE INVENTION

Figure 1:
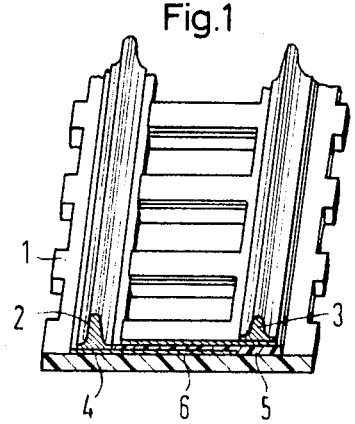
FIG. 1 is an isometric view of a portion of a track structure, illustrated as embodying simulated ties of a railroad road bed, etc.

FIG. 1 illustrates a model track structure, illustrated, for example, as being a section of a model railway track having a simulated tie structure 1 of insulating material upon which are supported a pair of rail elements 2 and 3, between which extends a capacitor structure comprising a first electrode 4 which is operatively connected with the left hand rail element 2, an insulating layer 5 disposed on the top face of the electrode 4 and a second capacitor electrode 6 which is operatively connected with the right hand rail element 3, with the capacitor thus formed extending over the entire length of the rail section. The respective electrodes are connected with the associated rail elements over a comparatively large area, preferably continuously throughout the length of the rail element. If the tie structure is constructed of metal instead of insulating material, it can form the lower capacitor electrode and thus take the place of the individual electrode 4.

Figure 2:
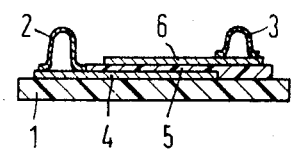
FIG. 2 is a transverse sectional view of the track structure illustrated in FIG. 1.

The construction will be apparent from a reference to FIG. 2 in which it will be noted that the capacitor electrodes 4 and 6 are transversely staggered to provide marginal, longitudinally extending free portions on each electrode to which the respective rail elements are suitably secured, providing a large surface area contact between the rail and electrode and at the same time eliminating any possible short circuiting between the respective capacitor electrodes as a result of protruding edges or the like. The actual production of the metal and insulating layers may be suitably effected, by the successive application of a conductive layer, insulating layer and second conductive layer, by suitable means such as atomizing, spraying, printing, evaporating, etc. Of importance, irrespective of the method employed, is that the electrodes themselves be of low resistance and that the insulation material disposed therebetween is pore-free and has as high dielectric constant as reasonably possible.

Figure 3:
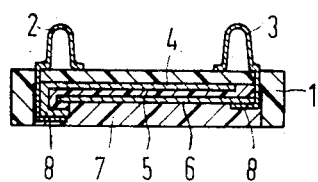
FIG. 3 is a sectional view, similar to FIG. 2, of a modified construction of track structure.

FIG. 3 illustrates a modified construction of the invention, particularly utilizable in model train tracks and the like, employing a premanufactured plastic foil which is coated with a metal layer on its opposite faces. In this construction the plastic foil 5, coated on its opposite sides with the metallic layers 4 and 6, is disposed at the lower or underside of the tie structure 1. Conductive connection between the respective rail elements 2 and 3 and the cooperable capacitor electrodes is effected by means of the mounting flange 8 which simultaneously serves as the mechanical mounting structure for the respective rail elements. To insure a good electrical contact between the rail element 2 and the electrode layer 4, the capacitor foil may, for example be folded or bent downwardly at the left edge thereof so that the latter portion of the electrode will be disposed at the inner face of the adjacent mounting structure for the rail element 2. To provide efficient insulation the recess in the lower face of the tie structure 1 may be suitably filled with a plastic mass or piece 7.

Figure 4:
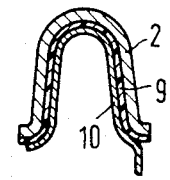
FIG. 4 is a transverse sectional view through a hollow rail structure illustrating the utilization thereof as a part of the capacitor structure.

Expediently the rail element may itself be utilized as a portion of the capacitor structure. Such a construction is illustrated in FIG. 4 in which the rail element is formed from sheet metal with a suitable configuration, that illustrated having a generally inverted U-shaped transverse cross section with the inner surface of the rail element being coated or otherwise provided with a layer 9 of insulating material, upon which is disposed a metal layer 10, with the latter layer being operatively connected to the opposite electrode of the capacitor structure and thus with the rail element 2, forming cooperable capacitor surface. It will be particularly noted that in this embodiment the distance between the interference source, for example a sparking between rail and wheel or contact is at a bare minimum. It will be apparent that it is particularly desirable that the metal layer 10 be conductively connected with the associated capacitor electrode over a relatively large surface area with low inductivity.

Figure 5:
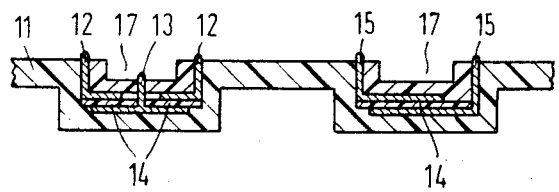
FIG. 5 is a transverse sectional view similar to FIG. 3 of a track structure of the type utilized with model auto race tracks, i.e., so-called "slot racers.

FIG. 5 illustrates the application of the inventive concept of the invention to current rails of model car race tracks, i.e., the so-called "slot racers." In this embodiment, the plastic road bed or track structure 11 is fabricated from suitable insulating plastic and provided with a groove or slot 17 therein. In the construction illustrated at the left hand side of the figure, two current rails 12, each of generally L-shape in transverse cross section, are disposed adjacent the slot 17. A third current rail 13 is centered in the slot 17 and of generally T-shape in transverse cross section with the horizontal portions 14 of the center rail being disposed in opposed relation to the horizontal portions of the respective rails 12 and insulated therefrom by a suitable insulating layer 14. In this construction two model vehicles may be operated independently from one another, one being supplied with power from the center rail 13 and one of the side rails 12, while the other model vehicle is supplied from the center rail 13 and the other side rail 12. Thus, a double capacitor is created which provides the desired interference protection of all current rails with respect to each other.

The right hand portion of FIG. 5 illustrates a similar construction for the operation of merely a single vehicle, in which the horizontal portions of the respective rails 15 are disposed in overlapping relation and insulated from one another by a layer or sheet 14 of dielectric material.

Figure 6:
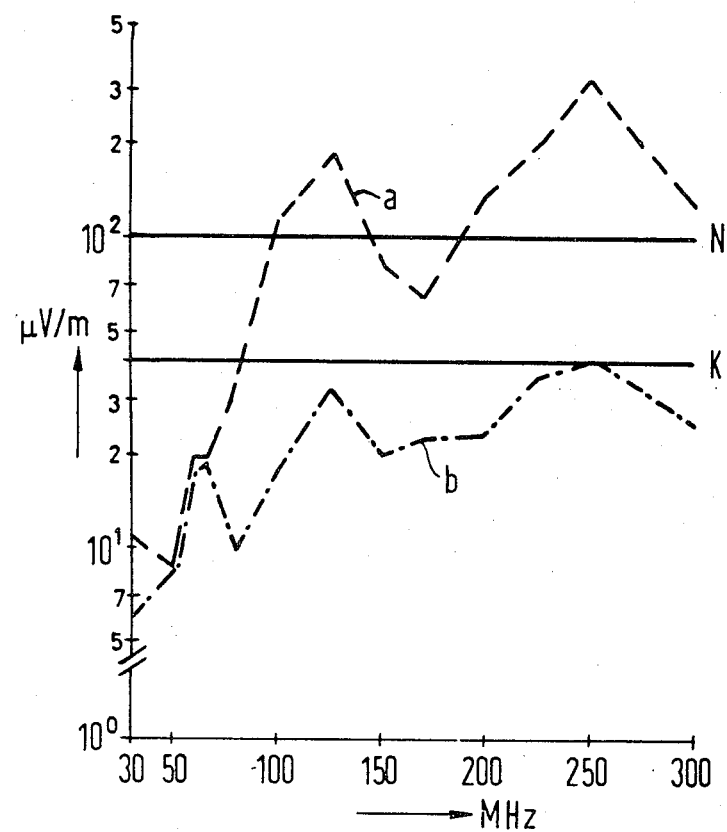
" and FIG. 6 is a chart illustrating relative interference levels with and without the use of the present invention.

FIG. 6 presents a comparison of interference levels between an ordinary track construction and that embodying the invention. In this figure, the line N indicates the normal maximum level of interference usually permitted, while the line K represents the maximum interference level in a track structure embodying the invention. Referring to the diagram, in which the abscissa represents the frequency range and the ordinate the interference field strength in $\mu$ V/m. It will be noted that the standard track construction, designated by the broken line A produces greatly increased interference over a track section constructed in accordance with the present invention, represented by the dot-dash line B with the interference from the known structure greatly exceeding the limit value N over a relatively wide frequency range. Thus the invention achieves a pronounced and material reduction in radiated interference.

Having thus described my invention it will be obvious from the above description that various immaterial modifications may be made in the same without departing from the spirit and scope of the invention.

I claim:

1. A model rail structure, producing low electrical interference radiation in use, for electrically driven track-powered toys such as model race cars, trains, and the like, comprising at least two longitudinally extending current-conducting rail elements adapted to be disposed on different supply potentials, supporting means for said rail elements and cooperable therewith to form a length of track, a pair of longitudinally extending cooperable capacitor electrodes disposed in opposed relation, and a dielectric layer operatively disposed between said capacitor electrodes, at least one of said rail elements being conductively connected to one of said capacitor electrodes and the other of said rail elements being conductively connected to the other of said electrodes with the capacitor thus formed having a capacitance distributed relatively uniformly along the rail.

2. A model rail structure according to claim 1, wherein the electrodes of the capacitor have a configuration corresponding to the associated configuration of the associated track whereby said capacitor does not conflict with the natural appearance thereof.

3. A model track rail structure according to claim 1, wherein the capacitor comprises a foil having a metalized coating on each side.

4. A model rail structure according to claim 1, wherein the capacitor comprises layers of metal and insulation sequentially applied upon the track.

5. A model rail structure according to claim 4, wherein the metal layers are disposed in staggered relation and the rail elements conductively engaged with respective, nonopposed portions of the metal layers.

6. A model rail structure according to claim 1, wherein at least one rail element is operatively disposed in opposition to a portion of the capacitor electrode conductively isolated therefrom and therewith creates a portion of the total capacity of said capacitor.

7. A model rail structure according to claim 6, wherein a thin layer of insulation is disposed on the inner face of the rail cross section, and the cooperable electrode is disposed on such layer.

8. A model rail structure according to claim 7, wherein each of said rail elements are of generally inverted U-shape in transverse cross section.

9. A model rail structure according to claim 1, wherein in the capacitor electrodes and the respective associated rail elements are soldered to each other.

10. A model rail structure according to claim 1, wherein in the capacitor electrodes and the respective associated rail elements are clamped together.

11. A model rail structure according to claim 1, wherein the respective rails are substantially continuously conductively connected to the cooperable capacitor electrode.

12. A model rail structure according to claim 1, wherein said supporting structure has a generally ladder-shaped configuration, simulating a railroad road bed having iron ties upon which the rails are supported, with said capacitor electrodes having a shape conforming to the iron ties and thereby forming a part thereof.

* * * * *